(12) United States Patent
Pandey et al.

(10) Patent No.: US 8,000,283 B2
(45) Date of Patent: Aug. 16, 2011

(54) METHOD AND APPARATUS FOR RELAY STATION NEIGHBOR DISCOVERY

(75) Inventors: Aparna Pandey, Chicago, IL (US);
Shyamal Ramachandran, Lake Mary, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 865 days.

(21) Appl. No.: 12/021,564

(22) Filed: Jan. 29, 2008

(65) Prior Publication Data
US 2008/0219202 A1 Sep. 11, 2008

Related U.S. Application Data

(60) Provisional application No. 60/893,426, filed on Mar. 7, 2007.

(51) Int. Cl.
*H04B 7/14* (2006.01)
(52) U.S. Cl. .......................................... 370/315; 370/254
(58) Field of Classification Search .................... 370/315, 370/328, 338, 395.4, 254, 255, 329, 470, 370/471; 709/223, 224
See application file for complete search history.

(56) References Cited

U.S. PATENT DOCUMENTS

| | | | |
|---|---|---|---|
| 2006/0198346 A1* | 9/2006 | Liu et al. | 370/338 |
| 2006/0259602 A1* | 11/2006 | Stewart et al. | 709/223 |
| 2007/0195746 A1* | 8/2007 | Ryu et al. | 370/338 |
| 2007/0233887 A1* | 10/2007 | Nubani et al. | 709/230 |
| 2008/0209028 A1* | 8/2008 | Kurup et al. | 709/224 |
| 2009/0144408 A1* | 6/2009 | Wilf et al. | 709/224 |

FOREIGN PATENT DOCUMENTS

KR 10-2001-0023447 A 3/2001

OTHER PUBLICATIONS

W. Zou and J. Liu, "Neighborhood Discovery and Topology Learning", IEEE 802.16 Presentation Submission, IEEE S802.16J-06/28, Nov. 2006, 5 pages.
P. Wang and A. Boanu, "Relay-Station Preamble Segment Assignment/Re-assignment Scheme", IEEE C802.16j-06/199, Nov. 2006, 12 pages.
PCT/US2008/054495, PCT Search Report and Written Opinion, mailed Jul. 8, 2008, 10 pages.
PCT/US2008/054495, PCT Preliminary Report on Patentability, mailed Sep. 17, 2009, 8 pages.

* cited by examiner

*Primary Examiner* — Brian D Nguyen
(74) *Attorney, Agent, or Firm* — Randi L. Karpinia

(57) ABSTRACT

A method and apparatus for relay station neighbor discovery by providing predictable timing for relay station preambles and route advertisements, minimizing signaling overhead by keeping these times fixed, scheduling a subset of relay stations for transmission of relay station preamble during any given transmission zone, and allowing the scanning relay stations to scan for a fraction of a frame to determine its neighbors without any repercussions to its activity in the rest of the frame.

26 Claims, 7 Drawing Sheets

METHOD AND APPARATUS FOR RELAY STATION NEIGHBOR DISCOVERY

RELATED APPLICATIONS

The present application claims benefit under 35 U.S.C. §119(e) from U.S. Provisional Patent Application Ser. No. 60/893,426, filed Mar. 7, 2007, titled "Method And Apparatus For Relay Station Neighbor Discovery," commonly owned with this application by Motorola, Inc., the entire contents of which being incorporated herein by reference.

FIELD OF THE INVENTION

The present invention relates generally to wireless communication networks and more particularly to the operation of a communication network utilizing relay stations.

BACKGROUND

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of adhoc network nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination IEEE 802.16 is a point-to-multipoint (PMP) system with one hop links between a base station (BS) and a subscriber station (SS). Such network topologies severely stress link budgets at the cell boundaries and often render the subscribers at the cell boundaries incapable of communicating using the higher-order modulations that their radios can support. Pockets of poor-coverage areas are created where high data-rate communication is impossible. This in turn brings down the overall system capacity. While such coverage voids can be avoided by deploying BSs tightly, this drastically increases both the capital expenditure (CAPEX) and operational expenditure (OPEX) for the network deployment. A cheaper solution is to deploy relay stations (RSs) (also known as relays or repeaters) in the areas with poor coverage and repeat transmissions so that subscribers in the cell boundary can connect using high data rate links.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
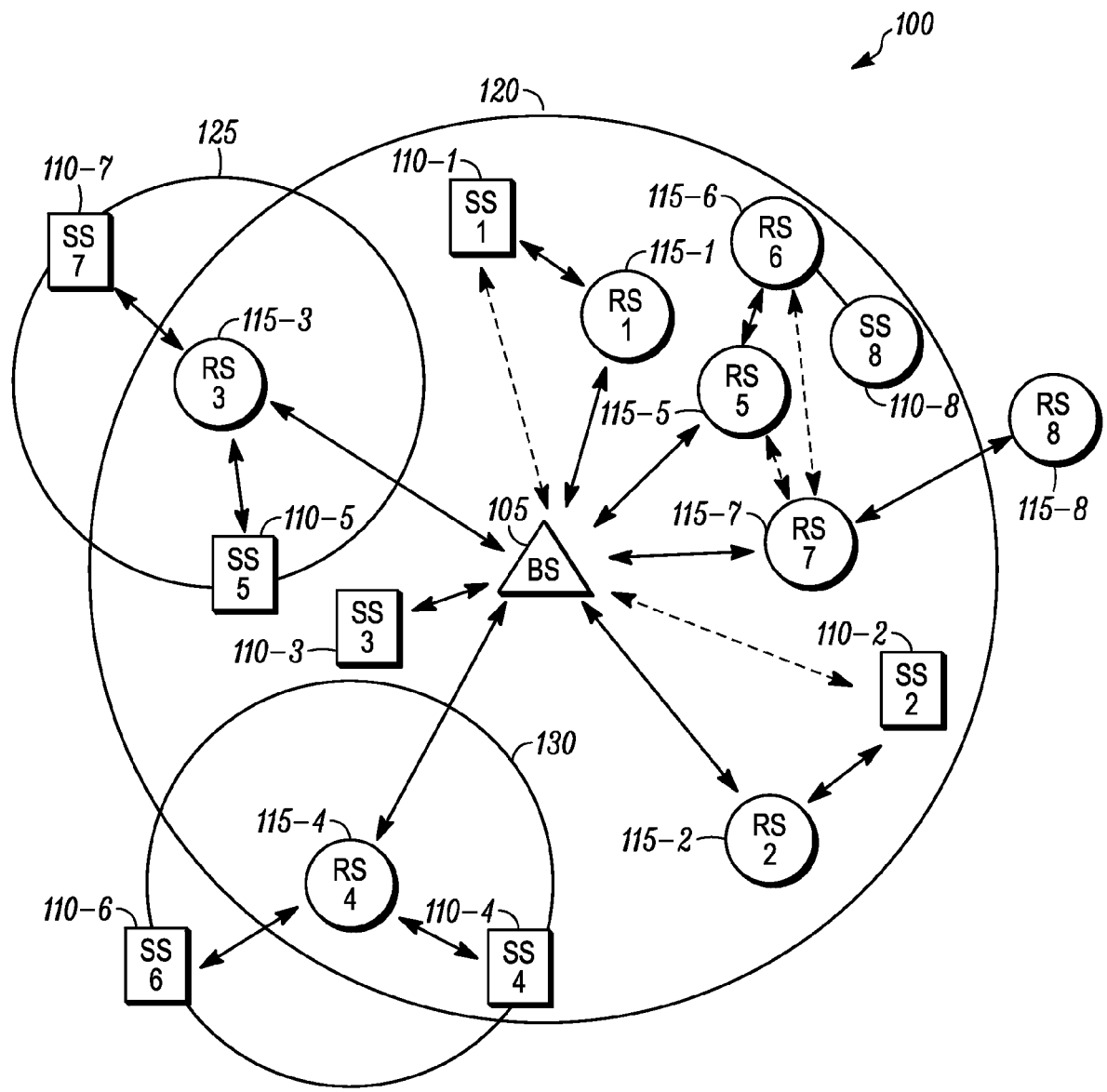
FIG. 1 illustrates an example wireless communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to relay station neighbor discovery. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of relay station neighbor discovery described herein. The non-processor circuits may include, but are not limited to, a radio receiver, a radio transmitter, signal drivers, clock circuits, power source circuits, and user input devices. As such, these functions may be interpreted as steps of a method to perform neighbor discovery. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 illustrates a wireless communication network for use in the implementation of at least some embodiments of the present invention. FIG. 1 specifically illustrates an IEEE 802.16 network 100. As illustrated, the network 100 includes at least one base station 105 for communication with a plurality of subscriber stations 110-$n$ (also known as mobile stations). The network 100 further includes a plurality of relays 115-$n$ (also known as relay stations or repeaters). The relays 115-$n$ are deployed in the areas with poor coverage and relay transmissions so that subscriber stations 110-$n$ in a cell boundary can connect using high data rate links. In some cases relays 115-$n$ may also serve subscriber stations 110-$n$ that are out of the coverage range of the base station 105. In some networks, the relays 115-$n$ are simpler versions of the base station 105, in that they do not manage connections, but only assist in relaying data. Alternatively, the relays 115-$n$ can be at least as complex as the base station 105. Further, all or some of the relay stations 115 can be deployed in a multi-hop pattern. In other words, some relays such as 115-6 communicate with the base station 105 via other relays such as 115-5. Further, these relays can be within each other's coverage. RS5 115-5 is considered to be an ascendant station (i.e., a station through which RS6 115-6 communicates with the BS) for RS6 115-6 and RS6 115-6 is considered to be a descendant station for RS5 115-5.

Figure 2:
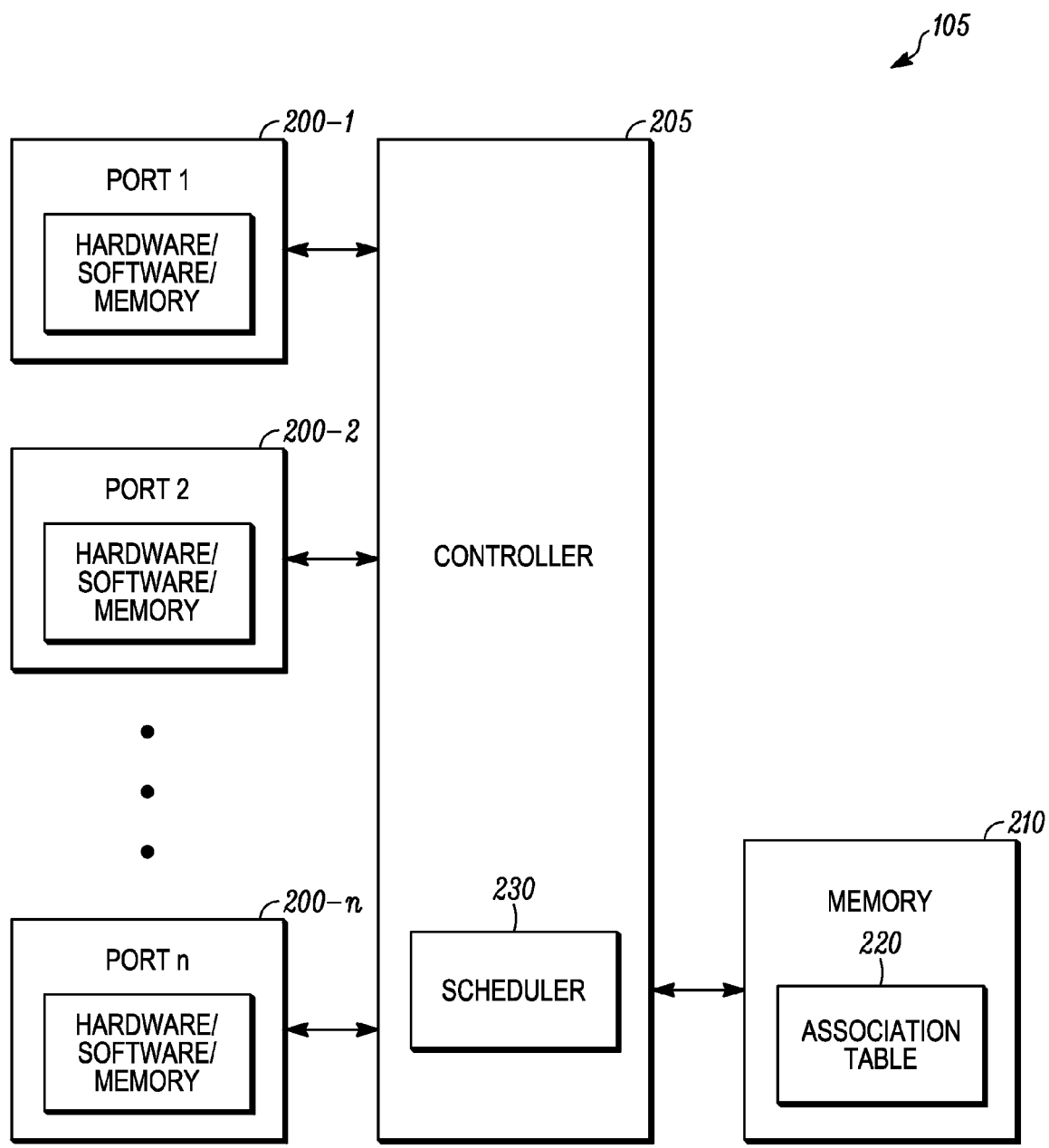
FIG. 2 illustrates an example base station for use in the wireless communication network of FIG. 1 in accordance with some embodiments of the present invention.

FIG. 2 illustrates a base station 105 in accordance with at least some embodiments of the present invention. As illustrated, the base station 105 comprises a plurality of ports 200-$n$, a controller 205, and a memory 210.

Each port 200-$n$ provides an endpoint or "channel" for network communications by the base station 105. Each port 200-$n$ may be designated for use as, for example, an IEEE 802.16 port or a backhaul port. For example, the base station 105 can communicate with one or more relay stations and/or one or more subscriber stations within an 802.16 network using an IEEE 802.16 port. An IEEE 802.16 port, for example, can be used to transmit and receive both data and management information.

A backhaul port similarly can provide an endpoint or channel for backhaul communications by the base station 105. For example, the base station 105 can communicate with one or more other base stations using the backhaul, which can be wired or wireless, via the backhaul port.

Each of the ports 200-$n$ are coupled to the controller 205 for operation of the base station 105. Each of the ports employs conventional demodulation and modulation techniques for receiving and transmitting communication signals respectively, such as packetized signals, to and from the base station 105 under the control of the controller 205. The packetized data signals can include, for example, voice, data or multimedia information, and packetized control signals, including node update information.

The controller 205 includes a scheduler 230 for the management of both uplink and downlink communication with the various subscriber stations (SS) 110-$n$ and relay stations (RS) 115-$n$ associated with the base station 105, which will be described in detail hereinafter. For example, the scheduler 230 schedules "n" fixed and predictable transmission zones (TxZ) for transmission of RS preambles and/or Route Advertisements, in accordance with some embodiments of the present invention. It will be appreciated by those of ordinary skill in the art that the scheduler 230 can be hard coded or programmed into the base station 105 during manufacturing, can be programmed over-the-air upon customer subscription, or can be a downloadable application. It will be appreciated that other programming methods can be utilized for programming the scheduler 230 into the base station 105. It will be further appreciated by one of ordinary skill in the art that the scheduler 230 can be hardware circuitry within the base station. In accordance with the present invention, the scheduler 230 can be contained within the controller 205 as illustrated, or alternatively can be an individual block operatively coupled to the controller 205 (not shown).

To perform the necessary functions of the base station 105, the controller 205 is coupled to the memory 210, which preferably includes a random access memory (RAM), a read-only memory (ROM), an electrically erasable programmable read-only memory (EEPROM), and flash memory.

The memory 210 includes storage locations for the storage of an association table 220. The association table 220, in accordance with the present invention, stores a listing of all subscriber stations 110-$n$ and relay stations 115-$n$ under the base station's domain along with other parameters such as the end-to-end path metrics to each of the subscriber stations 110-$n$ and relay stations 115-$n$ under its domain.

It will be appreciated by those of ordinary skill in the art that the memory 210 can be integrated within the base station 105, or alternatively, can be at least partially contained within an external memory such as a memory storage device. The memory storage device, for example, can be a subscriber identification module (SIM) card.

Figure 3:
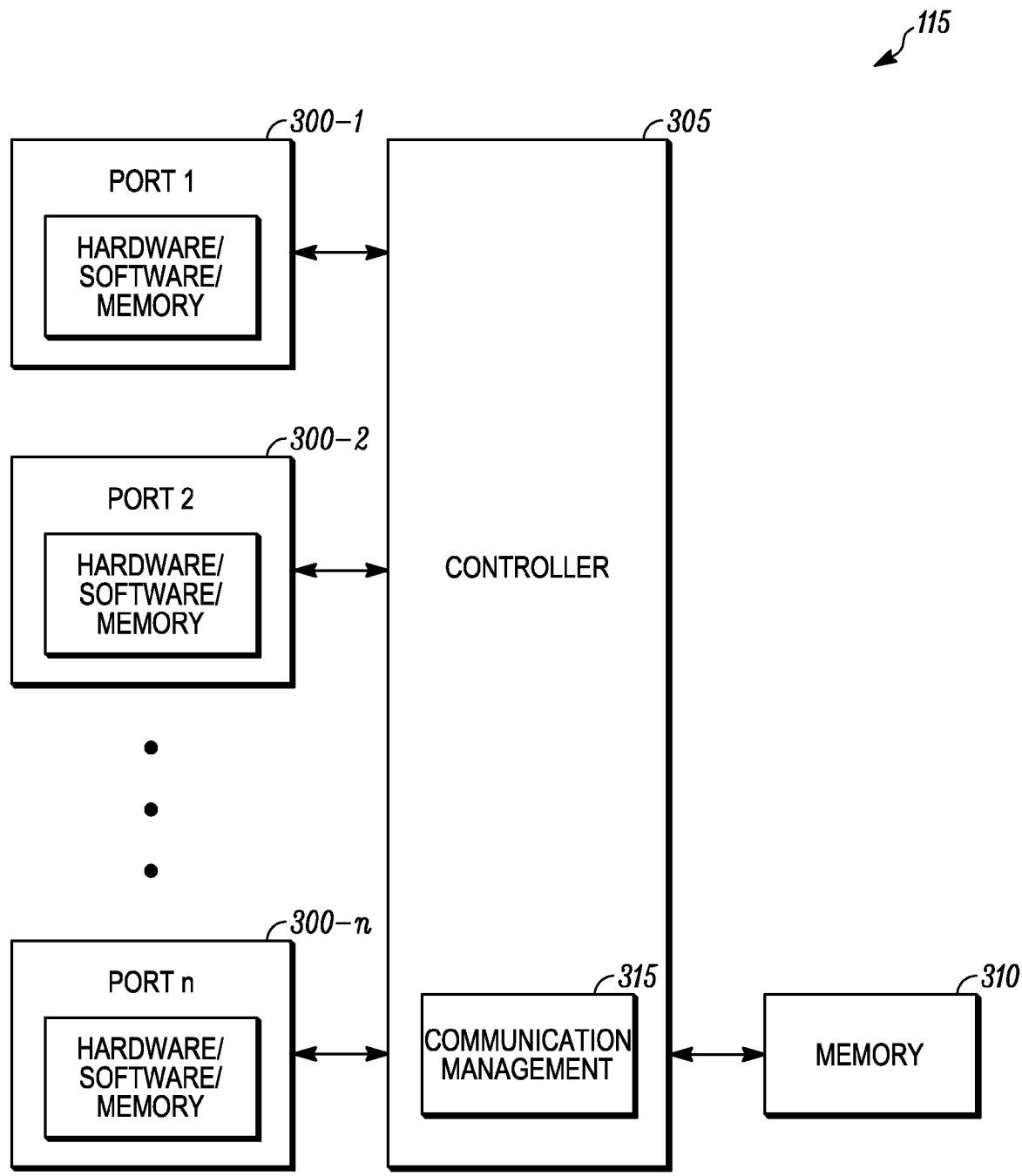
FIG. 3 illustrates an example relay station for use in the wireless communication network of FIG. 1 in accordance with some embodiments of the present invention.

FIG. 3 illustrates a relay station 115 in accordance with at least some embodiments of the present invention. As illustrated, the relay station 115 comprises a plurality of ports 300-$n$. Each port 300-$n$ may be designated for use as, for example, an IEEE 802.16 port or a backhaul port. For example, the plurality of ports 300-*n* can include an IEEE 802.16 port, which is used to communicate with one or more base stations, one or more relay stations and/or one or more subscriber stations. The relay station 115 further comprises a controller 305 and a memory 310.

An IEEE 802.16 port, for example, provides an endpoint or "channel" for 802.16 network communications by the relay station 115. For example, the relay station 115 can communicate with one or more base stations and/or one or more relay stations and/or one or more subscriber stations within an 802.16 network using the IEEE 802.16 port. An IEEE 802.16 port, for example, can be used to transmit and receive both data and management information.

Each of the ports 300-*n* are coupled to the controller 305 for operation of the relay station 115. Each of the ports employs conventional demodulation and modulation techniques for receiving and transmitting communication signals respectively, such as packetized signals, to and from the relay station 115 under the control of the controller 305. The packetized data signals can include, for example, voice, data or multimedia information, and packetized control signals, including node update information.

In accordance with the present invention, the controller 305 includes a communication management block 315 for managing communication links between the relay station 115 and one or more base stations 105-*n* and also with one or more subscriber stations 110-*n* as will be described hereinafter. For example, the communication management block 315 manages route establishment including the transmission of its RS preamble and/or Route Advertisement using received transmission zone allocations from its associated base station 105, in accordance with some embodiments of the present invention. It will be appreciated by those of ordinary skill in the art that the communication management block 315 can be hard coded or programmed into the relay station 115 during manufacturing, can be programmed over-the-air upon customer subscription, or can be a downloadable application. It will be appreciated that other programming methods can be utilized for programming the communication management block 315 into the relay station 115. It will be further appreciated by one of ordinary skill in the art that the communication management block 315 can be hardware circuitry within the relay station 115. In accordance with the present invention, the communication management block 315 can be contained within the controller 305 as illustrated, or alternatively can be an individual block operatively coupled to the controller 305 (not shown).

To perform the necessary functions of the relay station 115, the controller 305, and/or the communication management block 315 are each coupled to the memory 310, which preferably includes a random access memory (RAM), a read-only memory (ROM), an electrically erasable programmable read-only memory (EEPROM), and flash memory. It will be appreciated by those of ordinary skill in the art that the memory 310 can be integrated within the relay station 115, or alternatively, can be at least partially contained within an external memory such as a memory storage device. The memory storage device, for example, can be a subscriber identification module (SIM) card.

In typical systems such as the network 100, IEEE 802.16 base stations (BSs) do not forward traffic to other base stations on the IEEE 802.16 air interface. Further, IEEE 802.16 Relays (RSs) can forward traffic to base stations, relay stations, or subscriber stations (SSs). As previously mentioned, the relay stations are themselves managed/controlled by at least one of the base stations. Further relay stations can be fixed, nomadic or mobile.

As illustrated in FIG. 1, the relay stations 115-*n* of the network 100 can provide communication coverage outside the base station coverage area 120. For example, a relay station 3 115-3 provides a coverage area 125 and a relay station 4 115-4 provides a coverage area 130 which include communication coverage outside of a coverage area 120 of the base station 105. Thus communication by relay station 3 115-3 can include communication for subscriber station 7 110-7; and communication by relay station 4 115-4 can include communication for subscriber station 6 110-6, which otherwise would not be possible directly to the base station 105. Since subscriber station 6 110-6 and subscriber station 7 110-7 cannot be controlled by the base station 105 directly, they are entirely controlled by the relay stations 115-4 and 115-3 respectively, or by the base station 105 through the relay stations 115-4 and 115-3 respectively.

In summary, the relay stations (RS) introduced in an IEEE 802.16 system, can provide coverage and capacity gains by extending the base station's (BS) range and permitting subscriber stations (SS) to multihop to the BS.

Figure 4:
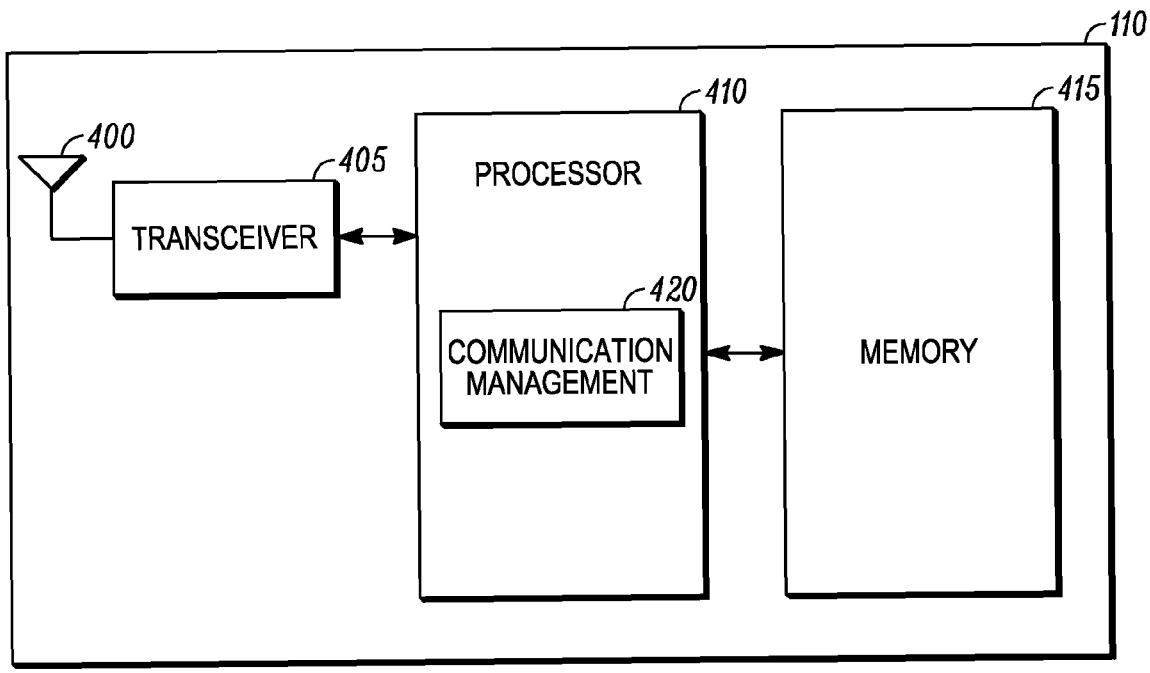
FIG. 4 illustrates an example subscriber station for use in the wireless communication network of FIG. 1 in accordance with at least some embodiments of the present invention.

FIG. 4 is an electronic block diagram of one embodiment of a subscriber station 110 in accordance with at least some embodiments of the present invention. The terminology "subscriber station" and "mobile station" are used interchangeably herein to refer to subscribers who may be fixed, nomadic or mobile. As illustrated, the subscriber station 110 includes an antenna 400, a transceiver (or modem) 405, a processor 410, and a memory 415.

The antenna 400 intercepts transmitted signals from one or more base stations 105, one or more relay stations 115, and/or one or more subscriber stations 110 within the network 100 and transmits signals to the one or more base stations 105, one or more relay stations 115, and/or one or more subscriber stations 110 within the network 100. The antenna 400 is coupled to the transceiver 405, which employs conventional demodulation techniques for receiving and transmitting communication signals, such as packetized signals, to and from the subscriber station 110 under the control of the processor 410. The packetized data signals can include, for example, voice, data or multimedia information, and packetized control signals, including node update information. When the transceiver 405 receives a command from the processor 410, the transceiver 405 sends a signal via the antenna 400 to one or more devices within the network 100. For example, the subscriber station 110 can communicate with one or more base stations and/or one or more relay stations and/or one or more subscriber stations within an 802.16 network by the antenna 400 and the transceiver 405 using IEEE 802.16, for example, to transmit and receive both data and management information.

In an alternative embodiment (not shown), the subscriber station 110 includes a receive antenna and a receiver for receiving signals from the network 100 and a transmit antenna and a transmitter for transmitting signals to the network 100. It will be appreciated by one of ordinary skill in the art that other similar electronic block diagrams of the same or alternate type can be utilized for the subscriber station 110.

Coupled to the transceiver 405, is the processor 410 utilizing conventional signal-processing techniques for processing received messages. It will be appreciated by one of ordinary skill in the art that additional processors can be utilized as required to handle the processing requirements of the processor 410.

In accordance with the present invention, the processor 410 includes a communication management block 420 for managing communication between the subscriber station 110 and at least one base station 105, relay station 115, or subscriber station 110. It will be appreciated by those of ordinary skill in the art that the communication management block 420 can be hard coded or programmed into the subscriber station 110 during manufacturing, can be programmed over-the-air upon customer subscription, or can be a downloadable application. It will be appreciated that other programming methods can be utilized for programming the communication management block 420 into the subscriber station 110. It will be further appreciated by one of ordinary skill in the art that the communication management block 420 can be hardware circuitry within the subscriber station 110. In accordance with the present invention, the communication management block 420 can be contained within the processor 410 as illustrated, or alternatively can be an individual block operatively coupled to the processor 410 (not shown).

To perform the necessary functions of the subscriber station 110, the processor 410 is coupled to the memory 415, which preferably includes a random access memory (RAM), a read-only memory (ROM), an electrically erasable programmable read-only memory (EEPROM), and flash memory. It will be appreciated by those of ordinary skill in the art that the memory 415 can be integrated within the subscriber station 110, or alternatively, can be at least partially contained within an external memory such as a memory storage device. The memory storage device, for example, can be a subscriber identification module (SIM) card.

In a Mobile Multihop Relay (MMR) network, relay stations in a cell (also referred to as a "sector") need to discover their neighbor relay stations to determine an optimal path or route towards their associated base station. To facilitate neighbor discovery of relay stations, relay stations transmit RS preambles (also known as "Relay Preambles" or "R-ambles") and Route Advertisements. An RS preamble is a known binary sequence that serves as an indication of an RS's presence in the neighborhood. There are many known RS preamble sequences in a network which can be distinguished from each other by their Preamble Sequence Identification. A Route Advertisement minimally contains the identification of the base station that the RS is associated with, the identification of the RS, its path metric or route metric towards the base station. In addition, the Route Advertisement can also include the Preamble Sequence ID associated with the given RS. The path metric or the route metric comprises of the metric that determines the suitability of the path or the route starting from the given RS towards the base station. It may contain relevant information such as the signal quality information, number of hops in the path, congestion information, battery-life information, etc.

The present invention provides a system and method to allocate a predictable Transmission Zone (TxZ), which carries RS preambles and Route Advertisements. In one embodiment, the Transmission Zone is placed at the end of the frame to guarantee predictability. In some embodiments, multiple relay stations transmit their RS preambles and Route Advertisements simultaneously. The remaining relay stations can scan at predictable times. In other embodiments, multiple relay stations transmit their RS preambles simultaneously but their Route Advertisements separately at different times. In yet other embodiments, multiple relay stations transmit their RS preambles simultaneously but the contents of their Route Advertisement message are separately distributed by the base station to all interested or concerned parties.

Figure 5:
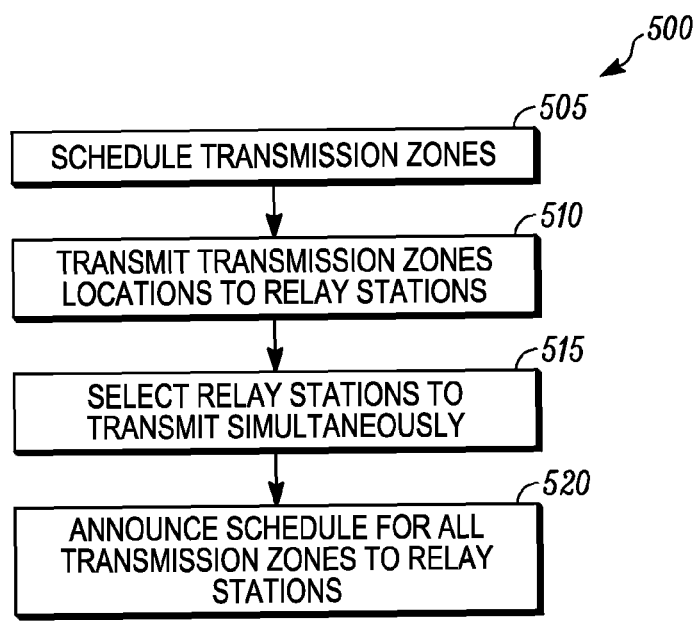
FIG. 5 is a flowchart illustrating the operation of the base station of FIG. 2 in accordance with some embodiments of the present invention.

FIG. 5 is a flowchart illustrating the operation 500 of the base station 105 in accordance with some embodiments of the present invention. Specifically, FIG. 5 illustrates the operation of the scheduler 230 of the base station 105 in providing assistance for neighbor discovery among the associated relay stations 115. As illustrated in FIG. 5, the operation 500 begins with Step 505 in which the base station 105 schedules "n" fixed and predictable transmission zones (TxZ) within a frame for transmission of RS preambles and/or Route Advertisement. Note that based on which embodiment is implemented, the TxZ could be one contiguous zone sufficiently large for the transmission of the RS preambles and the Route Advertisement, or the TxZ could be at least two contiguous zones, one for the RS preamble and another for the Route Advertisement, where multiple relay stations may be transmitting the Route Advertisements at different times, or the TxZ is just large enough for the RS preambles. Further, each of the "n" TxZs can be associated with a unique TxZ identifier (TxZ ID).

Figure 6:
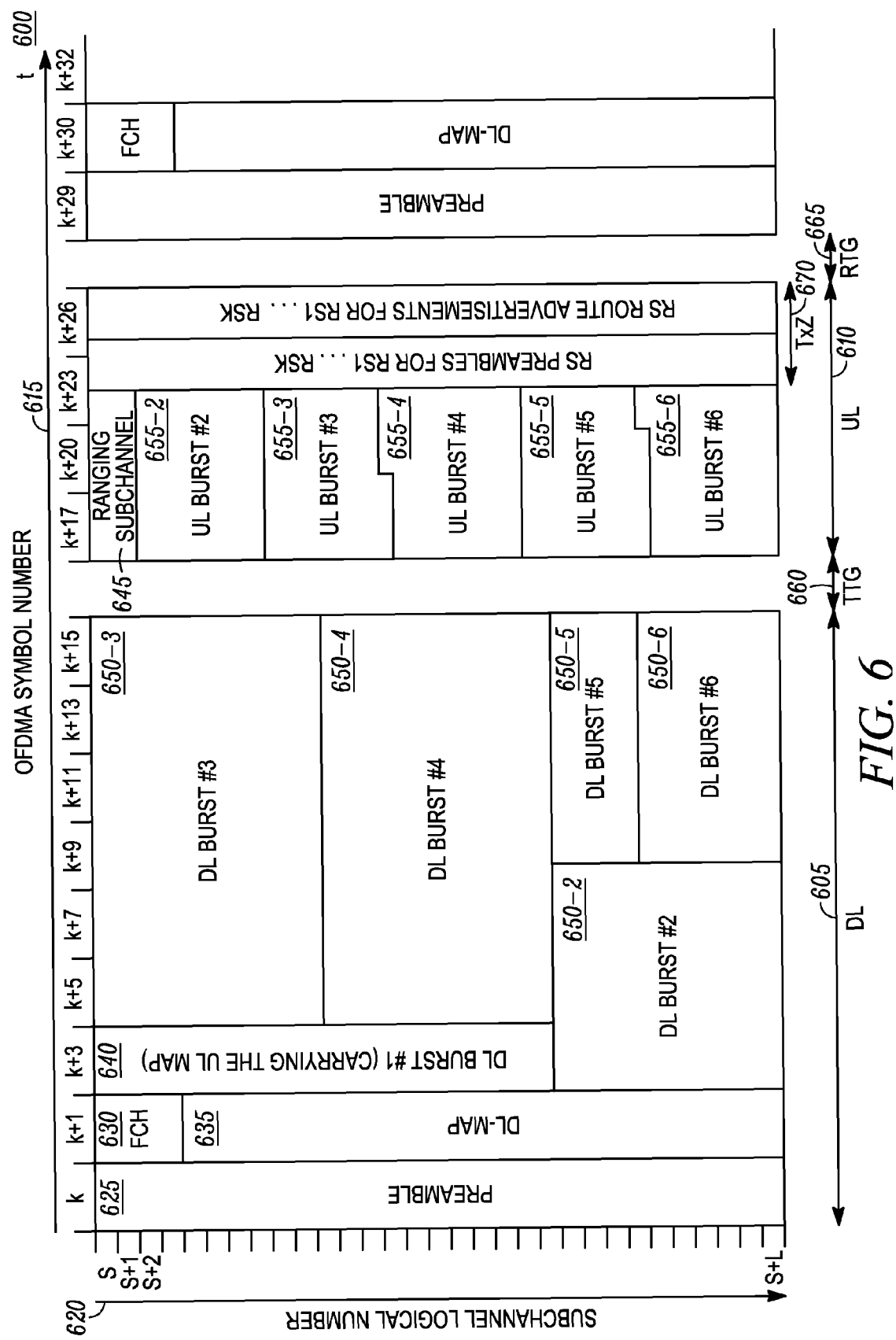
FIGS. 6 and 7 illustrate examples of frame structures for use in the operation of some embodiments of the present invention.

FIG. 6 illustrates an example frame structure 600 similar to the frame structure used in OFDMA systems such as IEEE 802.16e for implementing Step 505 in which the base station 105 schedules "n" fixed and predictable transmission zones (TxZ) for transmission of RS preambles+Route Advertisements. FIG. 6 shows a single frame with downlink (DL 605) and uplink (UL 610) subframes respectively: the boundary between the two is adapted based on traffic requirements. As defined by IEEE 802.16e the downlink subframe DL 605 is used for transmissions from the base station 105 to its descendent stations such as a subscriber station and the uplink subframe UL 610 is used for transmissions from the descendent stations such as a subscriber station 110 to the base station 105. The frame is shown to have two dimensions: one in time as denoted by the OFDMA symbol number 615 $v$ and one in frequency as denoted by the subchannel logical number 620.

As illustrated in FIG. 6, the frame 600 begins with a preamble 625 that is used for synchronization purposes. The Frame Control Header FCH 630 provides the frame information such as the length of DL-MAP 635 and the like. The DL-MAP 635 and the UL-MAP 640 provide allocation information for downlink and uplink, respectively. The UL Ranging subchannel 645 allows the subscriber stations 110-$n$ to get time and frequency synchronization and to request for bandwidth from the base station 105. In addition, the DL bursts 650-$n$ and UL-bursts 655-$n$ represent allocations for downlink and uplink transmissions, respectively. Transmit/receive Transition Gap TTG 660 and Receive/transmit Transition Gap RTG 665 represent the time intervals needed at the base station 105 to switch from transmit to receive and receive to transmit modes respectively. TxZ 670 identifies a region in the frame allocated in two dimensional manner in time and frequency domains. Specifically, FIG. 6 illustrates one TxZ 670 at the end of the frame. It will be appreciated by those of ordinary skill in the art that, in accordance with the present invention, any other part of the frame could be used as a TxZ location. Further, more than one TxZ per frame could be allocated. In addition, RS preambles and that for the accompanying Route advertisement may be transmitted on separate TxZs. It will further be appreciated that it is beneficial to minimize the number of extra transition gaps (TGs) required for transmitting and scanning relay stations. Further, "n" contiguous or non-contiguous TxZs may be allocated (not shown). (although this may cause more TG overhead). FIG. 6 illustrates one embodiment in which RS preambles and Route Advertisements are transmitted simultaneously by all scheduled relay stations during one given TxZ 670.

Figure 7:
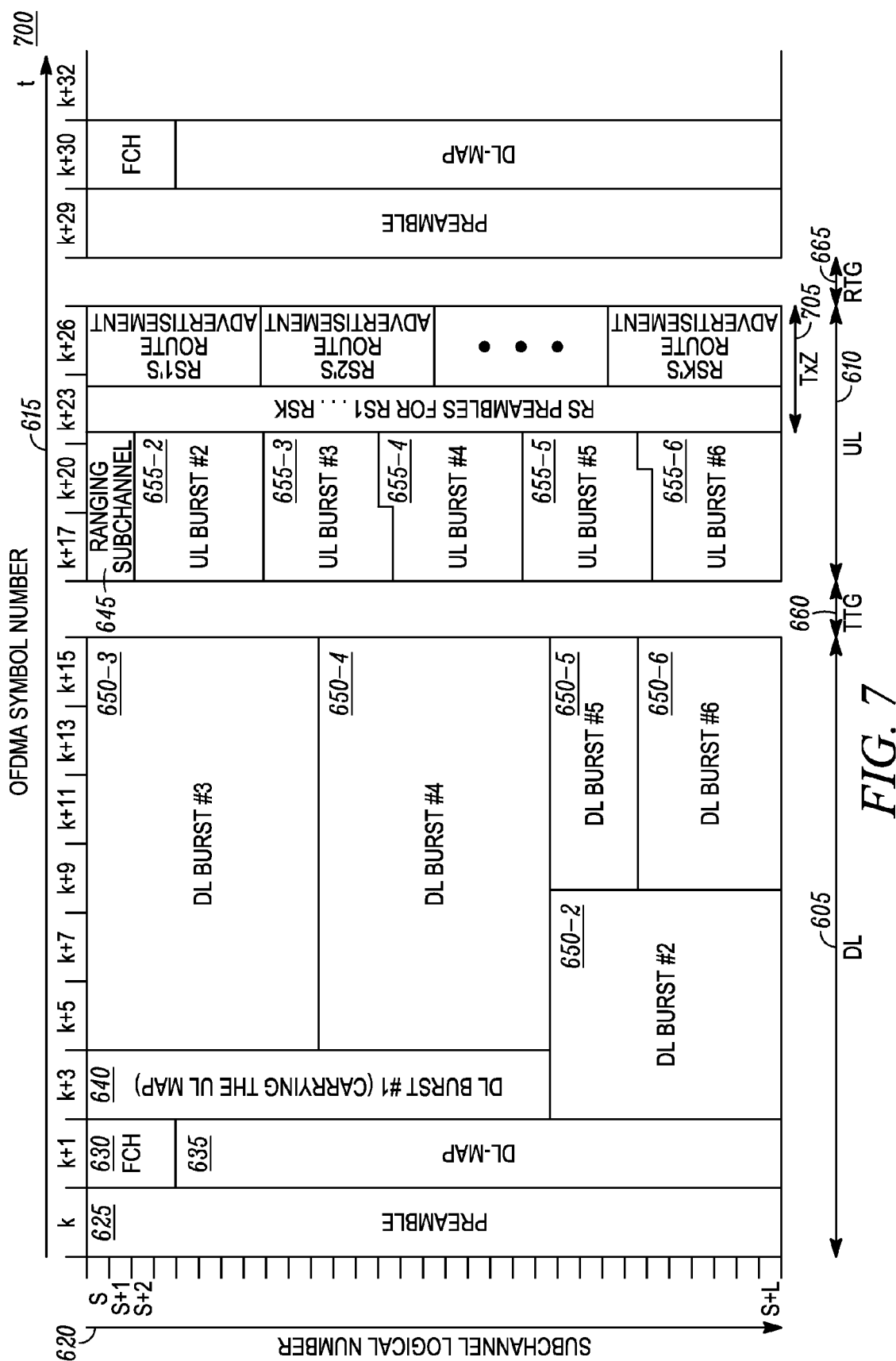

FIG. 7 illustrates another embodiment of a frame structure 700 for implementation of Step 505. In FIG. 7, the RS preambles by the scheduled k RSs are transmitted simultaneously in the given TxZ 705. However, the Route Advertisements are transmitted on separate subchannels by each of the 'k' relay stations that are scheduled to transmit in the given TxZ 705. In this embodiment, the transmitting relay station should include its Preamble Sequence ID in the Route Advertisement. The base station may need to announce the size of these burst allocations (which can remain fixed as long as 'k' is fixed). The scanning relay station may need to receive all the bursts to get the right Route Advertisement.

Referring back to FIG. 5, next, in Step 510, the base station 105 shares the TxZ locations with all RSs in the cell. The base station, for example, may unicast this information to the relay stations during registration or by other means. Alternatively, this information can be broadcast or multicast by the base station periodically. Alternatively, this information can be conveyed simultaneously with the information conveyed in step 520.

Next, in Step 515, for each TxZ, the base station schedules a maximum of "k" out of N_total RSs in the cell to transmit their RS preamble and/or Route Advertisement. It will be appreciated by those of ordinary skill in the art that the selection process is such that the no two RSs are assigned to be transmitting during the same TxZ consistently. Otherwise, these two RSs can never discover each other. The process can be a random selection. For example, the base station can randomly pick "k" out N_total RSs in the cell for transmission within each TxZ (within the same frame or in different frames). Alternatively, the process can be deterministic, for example, k=3, N_total=9 may result in RS allocation per TxZ to be: $(1,2,3)_1$, $(4,5,6)_2$, $(7,8,9)_3$, $(1,4,7)_4$, $(2,5,8)_5$, $(3,6,9)_6$, $(1,5,9)_7$, $(2,6,7)_8$, $(3,4,8)_9$ etc, where $(i,j,k)_p$ signifies RSi, RSj and RSk scheduled for transmission within the same TxZ p. Further, TxZ p and TxZ q (where p≠q) can be located either within the same frame or may be in two different frames. An RS need not transmit its RS preamble and/or Route Advertisement per frame. It will be appreciated by those skilled in the art that more constraints can be added. Specifically, a BS can decide that a RS should transmit its RS preamble and/or Route Advertisement with a certain periodicity (every "x" frames) for a particular duration (for the next "y" frames).

Next, in Step 520, the base station 105 announces the schedule information (i.e., the list of RSs that are scheduled to transmit their RS preambles and/or Routing Advertisements in a particular TxZ) for all TxZs to its RSs. This can be done using MAP (a message from the base station that provides sub-channel allocation information for downlink and/or uplink parts of the frame) or some other multicast or broadcast message. This announcement is mainly meant for the RSs that will transmit their RS preamble and/or Route Advertisement in the relevant TxZ. Therefore, it could also be done via unicast messages. If the schedule is known a priori, it could be announced to relevant RSs during network entry. The announcement identifies the TxZ ID and the RSs that are supposed to transmit during the relevant TxZ. In case of the embodiment of FIG. 7, the announcement may also include Route Advertisement Burst location within the TxZ.

Figure 8:
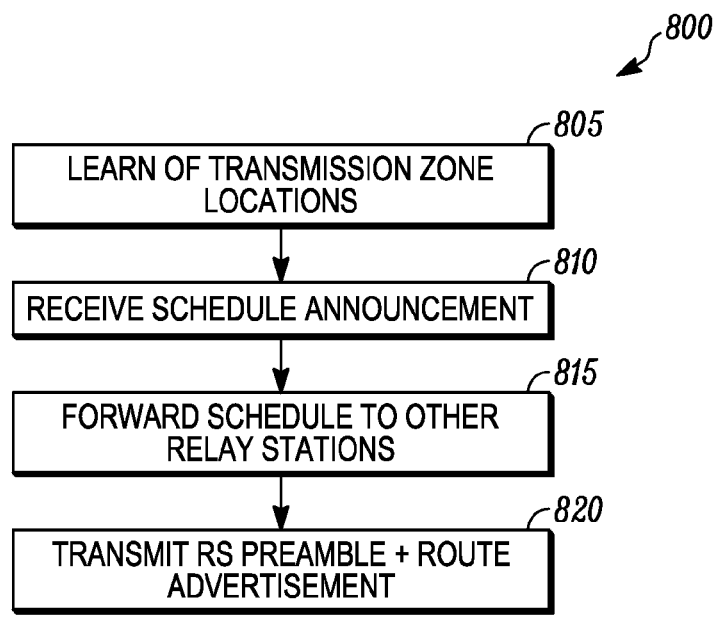
FIGS. 8 and 9 are flowcharts illustrating the operation of the relay station of FIG. 3 in accordance with some embodiments of the present invention.

FIG. 8 is a flowchart illustrating the operation 800 of a relay station 115 in accordance with some embodiments of the present invention. Specifically, FIG. 8 illustrates the operation 800 of a relay station 115 in assisting the forwarding of transmission zone scheduling information within a network 100. As illustrated, the operation 800 begins with Step 805 in which the relay station 115 learns of TxZ locations from the base station 105 in which it is associated. In another embodiment, the relay station 115-6 learns of TxZ locations from another relay station 115-5 which forwards the BS announcement to its descendent stations. Next, in Step 810, the relay station 115 receives the base station announcement of the schedule info for all TxZs either directly from the base station 105 or from another RS 115. Next, in Step 815, the relay station forwards the TxZ schedule to its descendent relay stations. It will be appreciated by those of ordinary skill in the art that the forwarding can be done using a multicast or alternatively a broadcast message. This announcement is destined for the RSs that will transmit their RS preamble and/or Route Advertisement in the relevant TxZ. Therefore, it could also be done via unicast messages. Further, in one embodiment, the relay station can only forward if one of the downstream relay stations is scheduled to transmit in a TxZ. If the schedule is known a priori, it could be announced to relevant RSs during network entry. The announcement identifies the TxZ ID and the RSs that are supposed to transmit during the relevant TxZ. In case of the embodiment of FIG. 7, the announcement may also include Route Advertisement Burst location within the TxZ. It will be appreciated that other announcement strategies can be applied as discussed previously. Next, in Step 820, if it the RS 115 is scheduled to transmit in a TxZ, the relay station transmits its RS preamble and/or Route Advertisement, accordingly. It identifies itself, the path metric from itself to its associated BS and optionally its Preamble Sequence ID in the Route Advertisement amongst other things.

Figure 9:
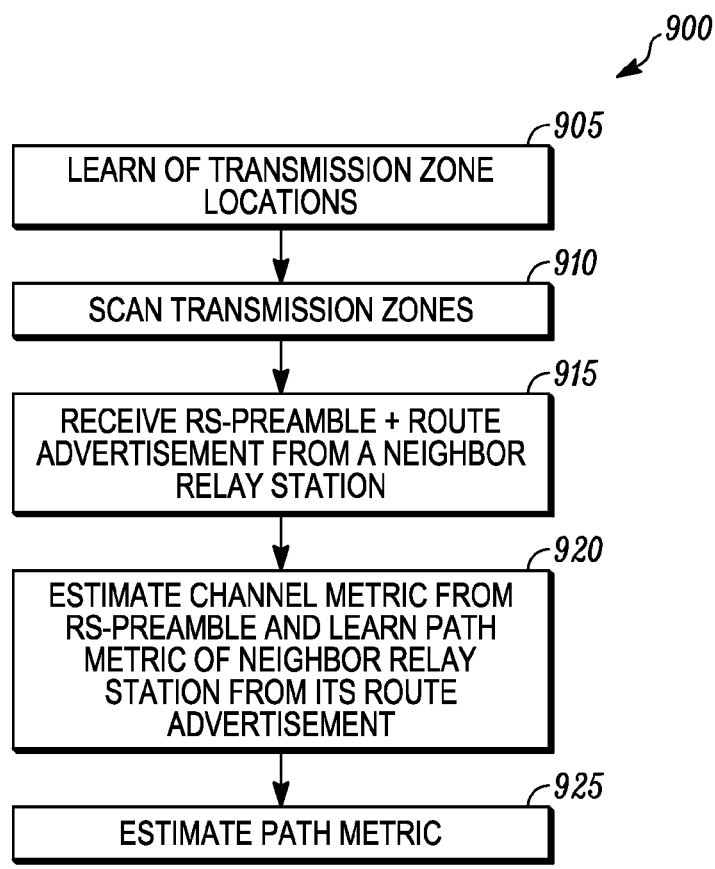

FIG. 9 is a flowchart illustrating the operation 900 of a relay station 115 in accordance with some embodiments of the present invention. Specifically, FIG. 9 illustrates the operation 900 of a relay station 115 when in a scanning mode. As illustrated, the operation begins with Step 905 in which the relay station learns of TxZ locations from either the base station 105 or another RS 115. Next, in Step 910, the relay station scans during known TxZs in one or more frames (in order to receive the RS preamble and/or Route Advertisement from all the possible neighboring RSs). It will be appreciated by those of ordinary skill in the art that the relay station 115 scans during a given TxZ only when it is not scheduled to transmit during the given TxZ. However, in another embodiment, the relay station 115 can scan and transmit simultaneously during a given TxZ, if it is equipped with more than one transceiver. If during TxZ, the base station 105 does not schedule any other tasks, then no scheduling issue for scans at the relay station 115 is foreseen. Since the TxZ locations are fixed and predictable, lesser scan time is required. Next, in Step 915, the relay station 115 receives the RS preamble and/or Route Advertisement from one or more neighboring relay stations. Next, in Step 920, the relay station estimates the channel metric or a measure of channel quality from the received RS preamble. The relay station also learns the path metric of the neighboring RS through the received Route Advertisement. Next, in Step 925, the relay station 115 estimates its own path metric of the path towards the BS via the discovered neighboring RS by updating the path metric in the received Route Advertisement with the estimated channel metric. In another embodiment, the scanning RS can use its own information such as number of hops in the path, congestion information, battery-life information, etc. to update its path metric of the path towards the BS via the discovered neighboring RS.

As described previously herein, the present invention provides a system and method for relay station neighbor discovery by providing predictable timing for relay station preambles and route advertisements, minimizing signaling overhead by keeping these times fixed, scheduling a subset of relay stations for transmission of RS-preamble etc. during any given TxZone, and allowing the scanning relay stations to scan for a fraction of a frame to determine its neighbors without any repercussions to its activity in the rest of the frame.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for relay station neighbor discovery within a wireless communication network, the method comprising:
   scheduling one or more transmissions zones within a frame for transmission of relay station preambles and route advertisements;
   communicating transmission zone locations to a plurality of relay stations;
   selecting each of a subset of the plurality of relay stations to transmit associated relay station preambles and route advertisements during each of the transmission zones, thereby creating a schedule; and
   announcing the schedule for all transmission zones to the plurality of relay stations.

2. The method of claim 1, wherein each of the transmission zones comprise at least two contiguous zones, wherein a first contiguous zone is for transmitting the relay station preambles and a second contiguous zone is for transmitting the route advertisements.

3. The method of claim 1, wherein each of the transmission zones comprises at least two non-contiguous zones, wherein a first non-contiguous zone is for transmitting the relay station preambles and a second non-contiguous zone is for transmitting the route advertisements.

4. The method of claim 1, wherein each transmission zone is associated with a unique transmission zone identifier.

5. The method of claim 1, wherein each transmission zone is located at the end of the frame.

6. The method of claim 1, further comprising:
   simultaneously transmitting associated relay station preambles and route advertisements by a subset of the plurality of relay stations within a transmission zone.

7. The method of claim 1, further comprising:
   simultaneously transmitting associated relay station preambles at a first transmission zone by a subset of the plurality of relay stations; and
   transmitting associated route advertisements at a second transmission zone by the subset of the plurality of relay stations.

8. The method of claim 7, wherein the transmitted route advertisements include one or more of a preamble sequence identification, the route advertisement, and a path metric from a relay station to its associated base station.

9. The method of claim 1, further comprising:
   simultaneously transmitting associated relay station preambles at a first transmission zone by a subset of the plurality of relay stations; and
   transmitting each of the route advertisements by a base station within the network.

10. The method of claim 1, wherein the communicating the transmission zone locations step comprises:
   unicasting the transmission zones locations to each of the plurality of relay stations during a registration process.

11. The method of claim 1, wherein the communicating the transmission zone locations step comprises:
   broadcasting the transmission zone locations to each of the plurality of relay stations periodically.

12. The method of claim 1, wherein the communicating the transmission zone locations step comprises:
   transmitting the transmission zone locations along with the announcing of the schedule step.

13. The method of claim 1, wherein the selecting step comprises:
   for each transmission zone, scheduling relay stations using a random selection.

14. The method of claim 1, wherein the selecting step comprises:
   for each transmission zone, scheduling relay stations using a deterministic selection.

15. The method of claim 1, wherein the selecting step comprises:
   scheduling each relay station to transmit its relay station preamble and route advertisement with a certain periodicity for a particular duration.

16. The method of claim 1, wherein the announcing step comprises:
   announcing the schedule using a message that provides sub-channel allocation information for a frame.

17. The method of claim 1, wherein the announcing step comprises:
   transmitting the schedule using one of a broadcast message and a multicast message.

18. The method of claim 1, wherein the announcing step comprises:
   unicasting the schedule during a network entry of a relay station.

19. The method of claim 1, wherein the announcing step comprises:
   communicating the schedule from a base station to a plurality of relay stations directly communicating with the base station; and
   forwarding the schedule from the plurality of relay stations to each of their associated descendent relay stations, wherein the forwarding comprises communicating using one of a broadcast message, a multicast message, and a unicast message.

20. The method of claim 19, wherein the schedule includes a route advertisement burst location within the transmission zone.

21. The method of claim 1, further comprising within a relay station:
   receiving the transmission zone locations;
   scanning during known transmission zones in one or more frames to receive the relay station preamble and route advertisement from one or more neighboring relay stations.

22. The method of claim 21, further comprising within the relay station:
   receiving a relay station preamble from one or more neighboring relay stations; and
   estimating a channel metric using the received relay station preamble.

23. The method of claim 22, further comprising within the relay station:
   receiving a route advertisement including a path metric from at least one of an associated base station and a neighboring relay station; and estimating its own path metric of the path towards the associated base station via the neighboring relay stations by updating the path metric in the received route advertisement with the estimated channel metric.

24. The method of claim 22, further comprising within the relay station:
estimating its own path metric towards an associated base station via the neighboring relay stations using one or more information comprising a number of hops in the path, a congestion information, and a battery-life information.

25. A method for relay station neighbor discovery within a wireless communication network, the method comprising:
within a relay station operating within the wireless communication network:
receiving one or more transmission zone locations from at least one of a base station and a neighboring relay station;
receiving a schedule for the one or more transmission zones from at least one of the base station and the neighboring relay station;
forwarding the schedule to one or more descendent relay stations; and
transmitting a relay station preamble and a route advertisement when the relay station is scheduled to transmit in a transmission zone, wherein the route advertisement includes at least one of a relay station identification, a path metric from the relay station to its associated base station, and optionally a preamble sequence identification.

26. A method for relay station neighbor discovery within a wireless communication network, the method comprising:
within a relay station operating within the wireless communication network:
operating the relay station in a scanning mode;
receiving one or more transmission zone locations from at least one of a base station and a neighboring relay station;
scanning during known transmission zones in one or more frames;
receiving an associated relay station preamble and an associated route advertisement, wherein the route advertisement includes a path metric, from one or more neighboring relay stations during the scanned transmissions zone frames;
estimating a channel metric from at least one of the received relay station preambles;
estimating a path metric of the relay station towards the base station via the one or more neighboring relay stations by updating each path metric in the received route advertisement with the estimated channel metric.

* * * * *